Oct. 16, 1956

R. B. POTTER 2,766,792

PRESSURE JUICE EXTRACTOR

Filed Oct. 21, 1952

INVENTOR.
Ralph B. Potter
BY John J. McLaughlin
Atty.

Oct. 16, 1956 R. B. POTTER 2,766,792
PRESSURE JUICE EXTRACTOR
Filed Oct. 21, 1952 3 Sheets-Sheet 3

INVENTOR.
Ralph B. Potter
BY John J. McLaughlin
Atty.

United States Patent Office 2,766,792
Patented Oct. 16, 1956

2,766,792

PRESSURE JUICE EXTRACTOR

Ralph B. Potter, Boulder, Colo.

Application October 21, 1952, Serial No. 315,904

9 Claims. (Cl. 146—3)

My invention relates to the extraction of juices from citrus fruits and the like.

The principal object of my invention is the provision of an improved method of and means for extracting juices from citrus fruits;

Another object is the provision of a method and means for extracting juice from citrus fruits particularly adapted for large-scale operations such as in the canning industry but also capable of use at fountains and the like;

Still another object of my invention is to provide a method of and means for extracting juice from citrus fruits which will introduce a minimum proportion of essential oils from the skin and therefore render the juice more adaptable for canning;

Other specific objects and features of the invention will be apparent in a consideration of the following detailed description taken with the accompanying drawings, wherein.

Figure 5:
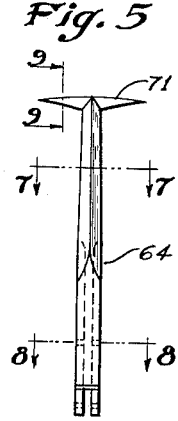
Fig. 5 is a front elevational view of one of the pulp cutting arms.
Figure 6:
Fig. 6 is a side view thereof.
Figure 7:
Figure 8:
Figure 9:

Figs. 7, 8 and 9 are sectional views thereof taken on the lines 7—7, 8—8, and 9—9, respectively, of Fig. 5.

In carrying out the method of my invention I preferably provide a generally tubular, slightly tapered body with a transverse partition intermediate its ends and radial openings on opposite sides of the partition. The tubular body is forced entirely through the citrus fruit so as to cut a core-like opening therethrough with the said radial openings remaining within the fruit. The cellular structure holding the juice is partly cut by the action of cutting the core-like opening, particularly if the core-like opening is formed directly in line with the point of engagement of the segments making up the citrus fruit. Since in operations where large numbers of citrus fruits may be handled by means of automatic feeder devices it is not practical to position the fruit accurately, I preferably also cut through the cellular walls within the fruit structure to facilitate operations in accordance with the final extraction step of the method. Differential vaporous pressure is then provided at the sets of holes on opposite sides of the partition within the tubular body, preferably by discharging vaporous fluid such as compressed air through one open end of the tubular body, but optionally and in some instances to advantage by connecting the opposite end of the tubular body to a source of vacuum.

The details of the method will be more fully apparent from a consideration of the mechanism with which it may be practiced, as shown in the single embodiment thereof illustrated in the drawings.

Figure 1:
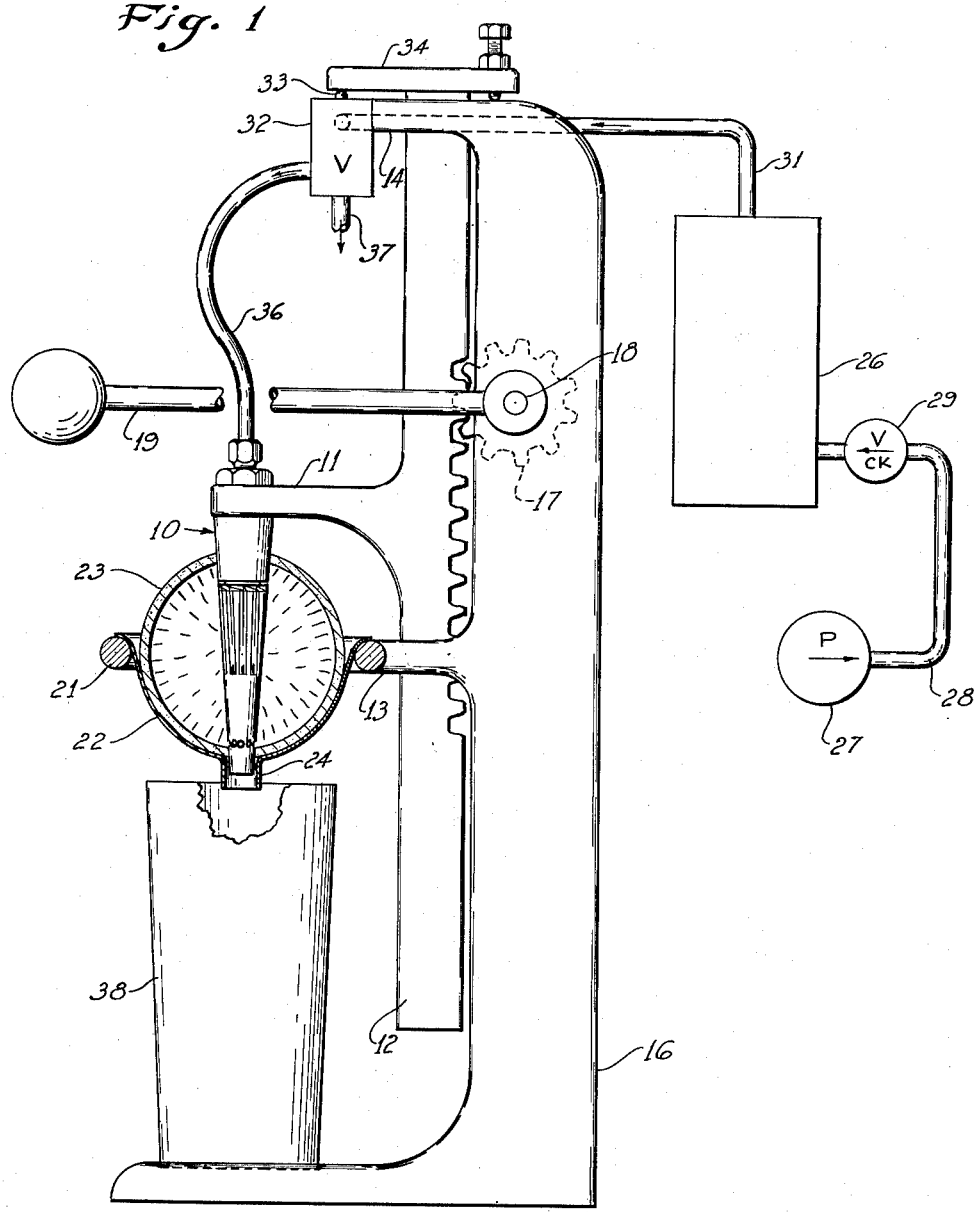
Fig. 1 is a partly schematic elevational view partly in section and with some parts broken away, showing one embodiment of my invention and illustrating the manner in which the method is practiced.

Looking first to Fig. 1, I show a slightly tapered, tubular body indicated generally by the reference character 10 supported on an arm 11 of a rack 12 reciprocal in guides 13 and 14 on a standard 16. A pinion 17 is carried by a shaft 18 journaled in the standard 16 and is adapted to be rotated by an arm 19 to raise or lower the tubular body 10. The guide 13 is extended to form a ring 21 carrying a cup-like support 22 for the citrus fruit 23. The cup-like support 22 has a bottom spout 24 through which the bottom end of the tubular body is adapted to project when the said tubular body has been inserted entirely through the fruit 23.

A reservoir 26 receives air under pressure from a pump 27 through a line 28, a check valve 29 being inserted in the line in accordance with standard practice in the art dealing with the compression and storage of compressed air. A line 31 extends from the reservoir 26 to a three-way valve 32 having a stem 33 adapted to be engaged by an actuating arm 34 carried at the top of the rack 12. Any suitable type of air control valve 32 may be used for delivering air under pressure through a line 36 to the top end of the tubular body 10 when the stem 33 is depressed, and exhausting such air through a line 37 when the stem 33 is released.

My invention is not concerned with the construction of the valve 32, but merely with the use of any valve capable of functionally supplying vaporous fluid under pressure in response to movement of the rack 12.

When air under pressure is delivered through the line 36, juice is forced out through the bottom open end of the tubular body 10 into a suitable container 38, shown simply and conveniently in the drawing as an ordinary tumbler. In actual practice any conventional means may be employed for receiving, collecting and storing the juice as it is obtained.

The details of construction of the tubular body are shown particularly in Figs. 2-9 inclusive. It comprises an upper, generally tubular but tapered portion 41 and a bottom portion 42, the external configuration of such portions 41 and 42 being such as to form a gradually tapered body. The bottom portion is open and its edge is sharpened to help penetrate the fruit.

Disposed within the portion 42 is a tubular insert 43 with a bottom flange 44 supporting a transverse partition 46 which also functions as a support for the pulp-cutting arms, as will be described. Where the tubular insert 43 overlaps the lower portion 42 of the tubular body, such body is provided with flutes 47 as shown particularly in Fig. 4; and the portion 42, tubular insert 43, and transverse partition 46 are all secured together as a single body as by welding, soldering, brazing, or the like.

The upper portion 41 of the tubular body 10 has a shoulder 48 and a tubular portion 49 of restricted cross section having the same internal diameter as the major portion of the tubular insert 43, the said tubular insert 43 having an offset portion 51 extending outside of the tubular portion 49 of restricted cross section forming a part of the portion 41 and having a top annular flange portion 52 spaced from the shoulder 48. Thus the tubular portion 49 and the tubular insert 43 below it form a continuous cylinder in which a piston assembly (which will be described) is adapted to reciprocate.

The bottom edge of the tubular portion 49 has a series of notches 53 cut therein so as to form a continuous passageway between that portion of the tubular body above the transverse partition 46 through the space between the tubular portion 49 and the offset portion 51 and through the space between the annular flange 52 and the shoulder 48.

The parts are maintained in assembled relation by dimples 54 in the tubular portion 49 and formed recesses 56 in the extension 51, conventional bayonet-type of slot communicating with recesses 56 so that by inserting the parts and making a slight turn the dimples 54 will engage in the recesses 56 with a spring action and form a tight assembly. Thus the entire tubular body may be taken apart for cleaning; but if this is not desired, a suitable permanent type of connection can readily be made between the tubular portion 49 and the offset portion 51.

The piston comprises a body portion 57 and a seal 58 of leather, rubber or the like held in position by a disk 59 and screw 61. Threaded axially in the bottom piston body 57 and extending through the partition 46 is an ejection rod 62. Links 63 have their upper ends pivoted to the plunger body 57 and their lower ends pivoted to cutting arms 64, the cutting arms 64 being pivoted to ears 66 projecting upwardly from the transverse partition 46. The cutting arms 64 normally lie between the flutes 47 as shown particularly in Fig. 4; and slots 67 in the tubular insert 43 are shaped to receive the bottom portion of the cutting arms 64. Looking particularly at Fig. 8 it will be noted that the portion of the cutting arms intermediate the ends thereof where the bottom of the links 63 connect is generally U-shaped and the linkage is so arranged that when the plunger moves downwardly the cutting arms are moved in a circle about their pivots on the ears 66 and the links 63 ride out through the top of the slots 67, which are made high enough to pass them.

Figure 2:
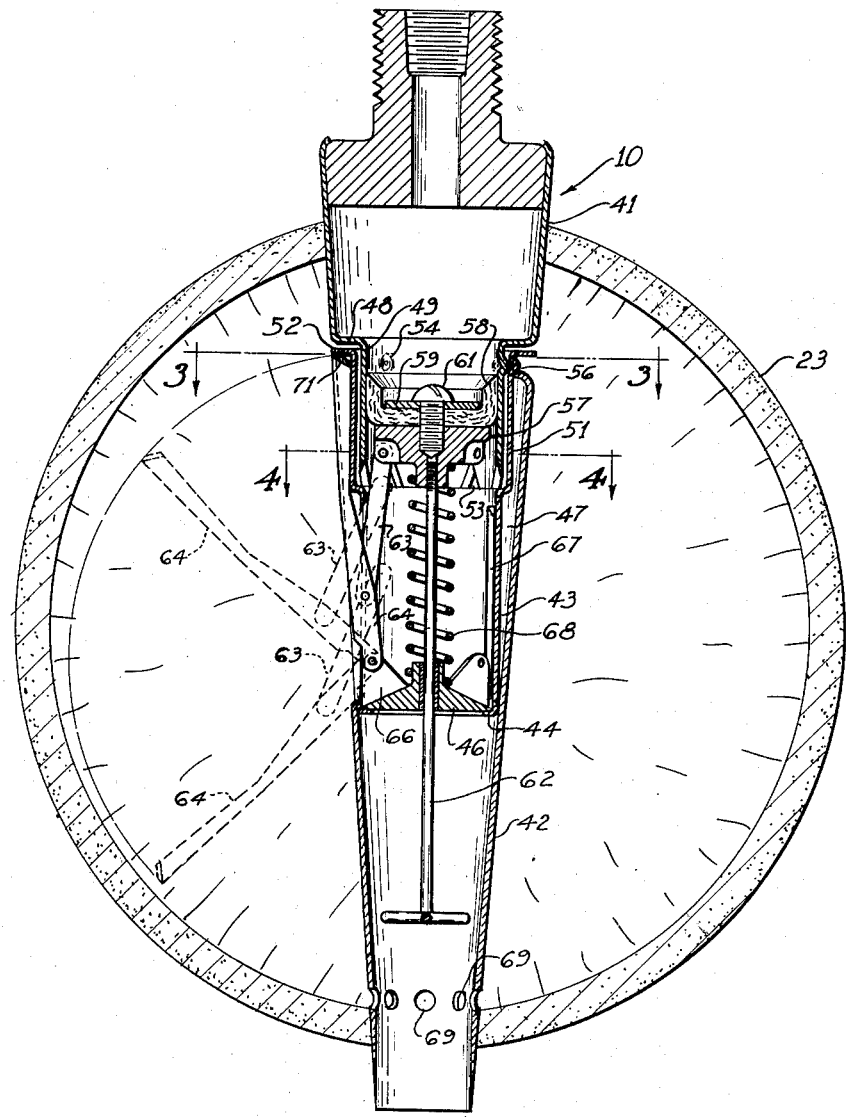
Fig. 2 is an enlarged sectional view partly in elevation of the fruit-engaging portion of the device and illustrating the manner in which it engages the fruit, the section being slightly irregular as shown by the section line 2—2 of Fig. 3.
Figure 3:
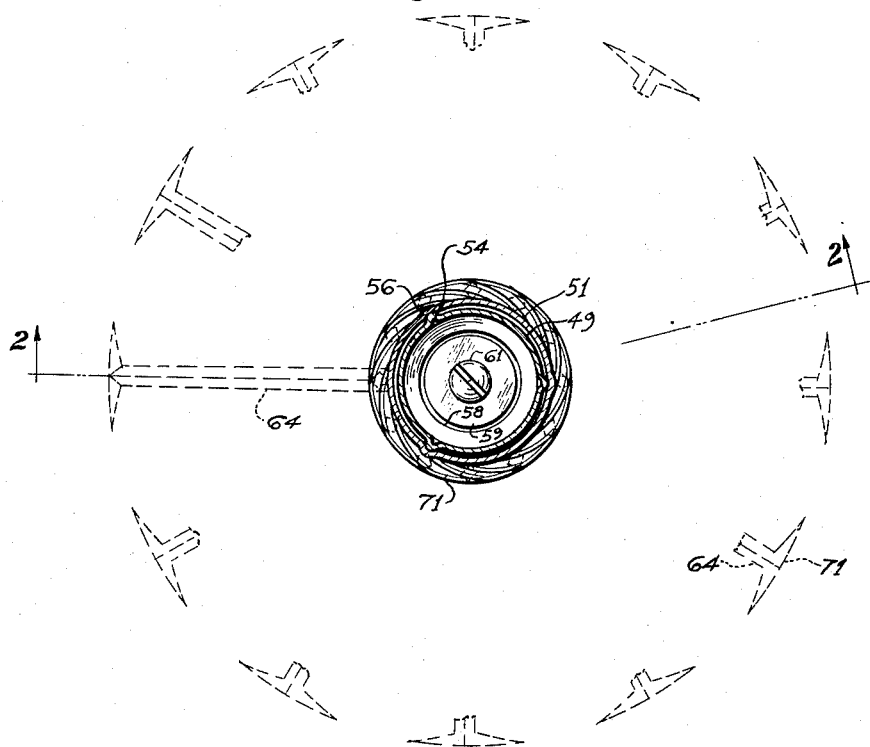
Fig. 3 is a plan sectional view taken on the line 3—3 of Fig. 2 looking in the direction of the arrows, the position of the cutting arms forming a part of the device when in fully actuated position being shown in broken lines.
Figure 4:
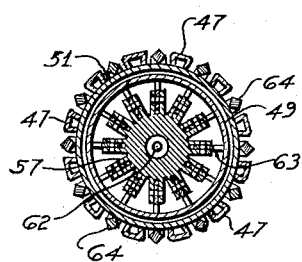
Fig. 4 is a plan sectional view taken on the line 4—4 of Fig. 2.

Normally the piston assembly is held in its upward position by a compression spring 68, and in this position the cutting arms lie flat beneath the annular flange 52 and between the flutes 47 as shown in full lines in Figs. 2 and 3. In this position the notches 53 are covered and no compressed air enters the fruit. However, when the piston has moved downwardly and the cutting arms have performed their cutting operation on the cellular walls of the fruit, the notches 53 are uncovered and air under pressure is discharged through the passageways described out through the annular opening beneath the shoulders 48. A series of annular openings 69 permits the juice to be forced by such pressure out of the fruit and into the bottom or spout portion of the tubular body for discharge into a suitable receptacle.

The cutting arms may take various shapes, but I have found it particularly desirable to form the main shank portion of the arm generally as a diamond, as shown in Fig. 7, and with a top cutting portion 71 having a cross section as shown in Fig. 9 but slightly pitched so that all of the top cutting portions 71 will nest together in the general manner shown in Fig. 3 when the piston is in its uppermost position. I secure two advantages by this construction: First, a sharp edge may be provided at both the shank portion and upper cutting portion of the cutting arms regardless of in which direction the cutting arms may be moving. The second advantage is that the cutting arms will lie along the outside of the tubular body so as to offer no obstruction to either the insertion or extraction thereof from the fruit.

The operation of the particular device shown in the drawings should in general be clear from the detailed description thereof. When the tubular body is inserted entirely through the fruit, air under pressure is automatically delivered to the top of the piston and the cutting blades make a wide sweep to perform an extensive cutting operation through the walls of the cells in which the juice is contained. Thus regardless of the position at which the tubular body is inserted, there is a sufficient breaking up of the pulp structure to make the juice readily extractable without tearing the pulp in such manner as to cause discharge of significant portions thereof with the juice itself. When the piston has descended low enough to admit air to the fruit, substantially all of the juice is discharged because of differential pressure. At the same time the ejection rod forces out of the end of the tubular body any portion of the core which may have lodged therein. The portion cut away from the fruit by the action of the tubular body is sufficiently large that it may be removed by a very coarse strainer and there is very little material, such as pulp or essential oils, left remaining in the extracted juice.

I have obtained good results by the use of compressed air to provide the differential extracting pressure, and I find that for many purposes there is an advantage control-wise in securing the differential vaporous pressure in this manner. Those skilled in the art will understand that the differential may also be established by introducing a vacuum at the opposite end of the tubular body; and there are structures and circumstances related to the use of my invention where vacuum may be preferred to the use of compressed air. It should also be borne in mind that when I refer to compressed air I do not exclude the use of other vaporous fluids under pressure such as carbon dioxide, nitrogen and the like where it is more advantageous or convenient to use the same.

I have described my invention in detail so that those skilled in the art may understand the manner of practicing the same, but the invention is limited only by the scope of the claims.

I claim:

1. A juice extractor for citrus fruits and the like comprising a generally tubular body having top and bottom open ends, with a transverse partition between said ends and openings above and below said partition, means for supporting fruit below said tubular body, means for moving said tubular body downwardly entirely through said fruit, and means for introducing a vaporous fluid under pressure at said top open end of said tubular body to discharge juice at said bottom end.

2. In a juice extractor for citrus fruits and the like a downwardly tapered, generally tubular body having a group of annularly disposed holes near its two ends and a transverse partition between said openings, one end of said tubular body having a sharp knife-like edge to cut through the fruit and the cellular structure thereof.

3. In a juice extractor for citrus fruits and the like a downwardly tapered, generally tubular body having a group of annularly disposed holes near its two ends, a transverse partition between said holes, and means carried by said tubular body to break up cellular walls of the fruit.

4. In a juice extractor for citrus fruits and the like a generally tubular body having a transverse partition intermediate its ends and annular openings above and below said partition, cutting arms pivoted to said tubular body near said partition and normally lying against the tubular body along its exterior surface, a piston in the tubular body normally spring pressed upwardly, link connections between said piston and cutting arms for moving the same about their said pivots when the piston is moved downwardly, said piston adapted to be moved downwardly by vaporous fluid under pressure and to uncover said top openings as it is moved downwardly.

5. In a juice extractor for citrus fruits and the like a generally tubular body having a transverse partition intermediate its ends and annular openings above and below said partition, cutting arms pivoted to said tubular body near said partition and normally lying against the tubular body along its exterior surface, a piston in the tubular body normally spring pressed upwardly, link connections between said piston and cutting arms for moving the same about their said pivots when the piston is moved downwardly, said piston adapted to be moved downwardly by fluid under pressure and to uncover said top openings as it is moved downwardly, and an ejection plunger connected to said piston and extending through said transverse partition.

6. A fruit juice extractor comprising a generally tubular, slightly tapered body open at both ends and a transverse partition intermediate such ends, annular openings being provided through said body on opposite sides of said partition and the smaller of said ends being sharpened to facilitate penetration of the fruit.

7. A juice extractor for citrus fruits and the like comprising a frame, a generally tubular body having top and bottom open ends with a transverse partition between said ends and openings above and below said partition, a support for said tubular body, a support for said fruit below said tubular body, said support having a bottom opening, means carried by the frame and effective to move said support for moving said tubular body downwardly entirely through said fruit, cutting means associated with said tubular body for breaking cellular walls of the fruit to more readily release juices therein, and means including a tubular connection to said tubular body for introducing a vaporous fluid under pressure at said top open end of said tubular body to discharge juice at said bottom open end.

8. A juice extractor for citrus fruits and the like comprising a frame, a generally tubular body having top and bottom open ends with a transverse partition between said ends and openings above and below said partition, a support for said tubular body, a support for said fruit below said tubular body, said support having a bottom opening, means carried by the frame and effective to move said support for moving said tubular body downwardly entirely through said fruit, means including a tubular connection to said tubular body for introducing vaporous fluid under pressure at said top open end of said tubular body, and means carried by said tubular body and actuated by said vaporous fluid pressure for breaking cellular walls of the fruit, whereby fruit juice may be delivered through said bottom openings and discharged through said bottom open end of said tubular body.

9. A fruit juice extractor comprising a frame, a generally tubular slightly tapered body open at both ends, a transverse partition intermediate the ends, annular openings being provided on opposite sides of the partition, a support for the said tubular body, a support for the said fruit below said tubular body, means carried by the frame to move said support downwardly to force the smaller end of said tubular body through the fruit, a tube connecting the larger end of said tubular body to a source of vaporous fluid under pressure, and a valve actuated by downward movement of said tubular body support for releasing said vaporous fluid under pressure when the fruit is fully penetrated by said tubular body.

References Cited in the file of this patent

UNITED STATES PATENTS

| | | |
|---|---|---|
| 1,925,196 | Maull | Sept. 5, 1933 |
| 1,994,114 | Somers | Mar. 12, 1935 |
| 2,475,559 | Wilson | July 5, 1949 |
| 2,575,584 | Cohen | Nov. 20, 1951 |

FOREIGN PATENTS

| | | |
|---|---|---|
| 774,454 | France | Sept. 24, 1934 |
| 104,515 | Switzerland | Apr. 16, 1924 |